Dec. 15, 1931.  W. C. HEDGCOCK  1,836,245
BRAKE RIGGING
Filed July 20, 1928  2 Sheets-Sheet 1
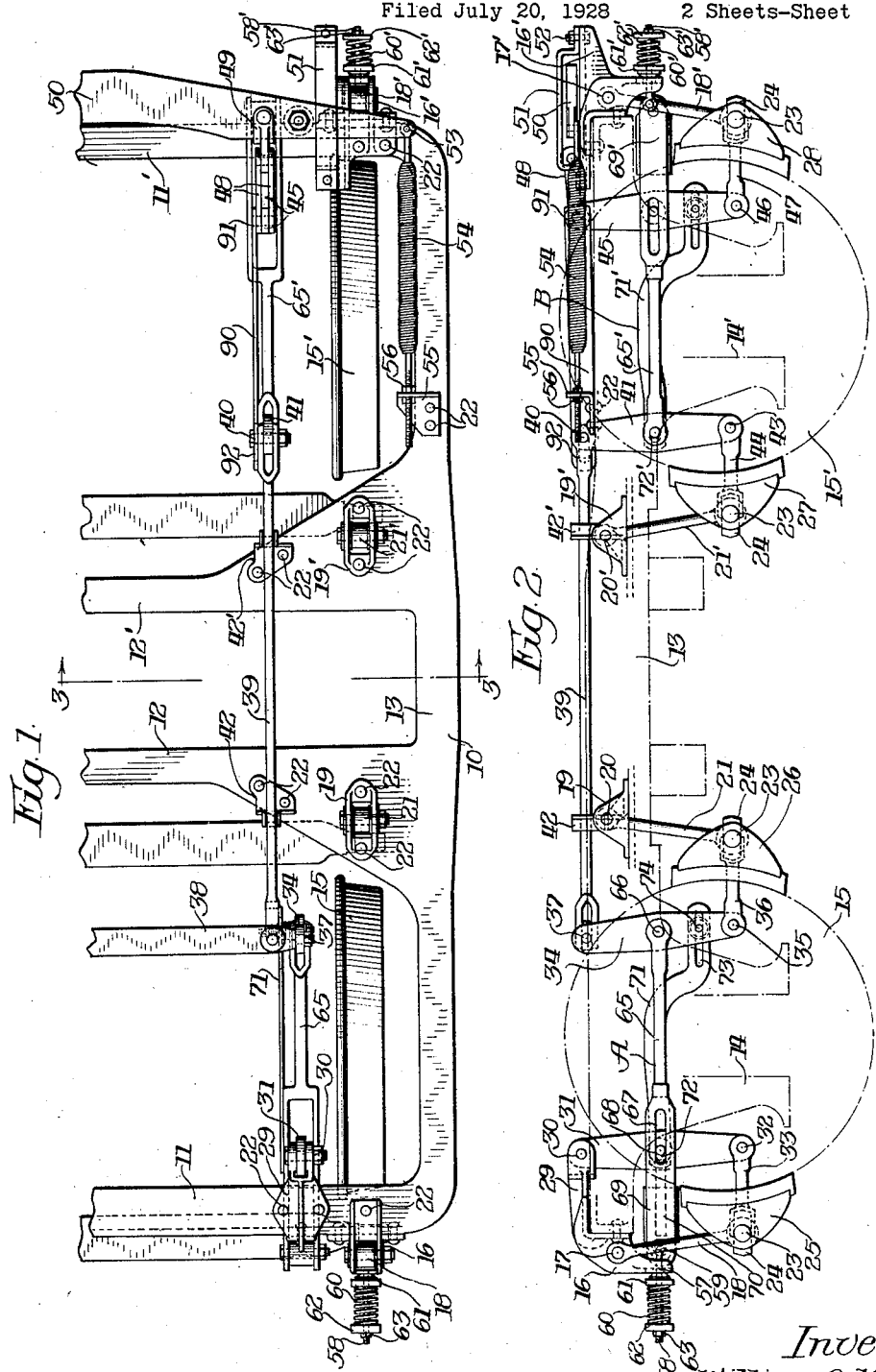
Inventor
William C. Hedgcock
By Wilkinson, Huxley, Byron, & Knight
Attys Dec. 15, 1931. W. C. HEDGCOCK 1,836,245
BRAKE RIGGING
Filed July 20, 1928 2 Sheets-Sheet 2
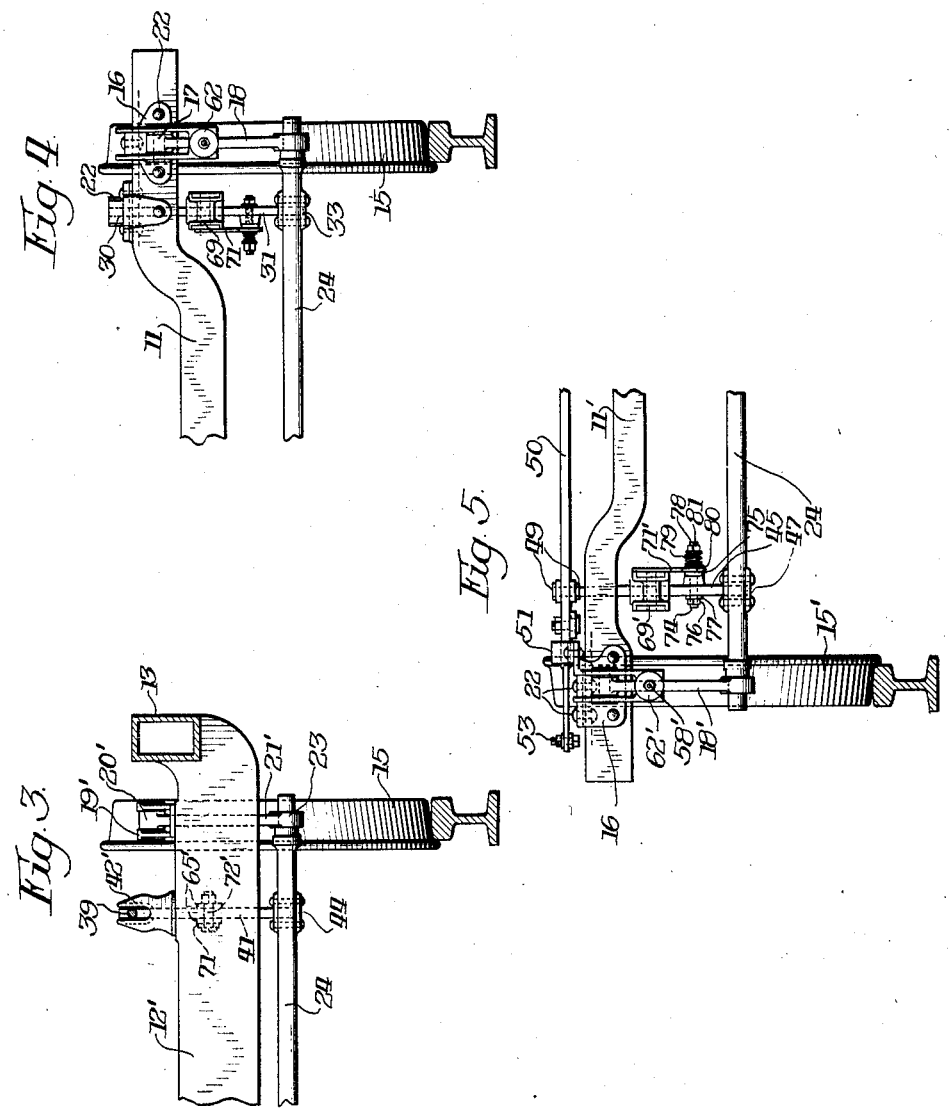
Inventor:
William C. Hedgcock
By Wilkinson, Huxley, Byron & Knight
Attys Patented Dec. 15, 1931

1,836,245

UNITED STATES PATENT OFFICE

WILLIAM C. HEDGCOCK, OF CHICAGO, ILLINOIS, ASSIGNOR TO AMERICAN STEEL FOUNDRIES, OF CHICAGO, ILLINOIS A CORPORATION OF NEW JERSEY

BRAKE RIGGING

Application filed July 20, 1928. Serial No. 294,176.

This invention relates to an improved brake rigging and particularly to the type of brake rigging employed for the trucks of the railway rolling stock and known in the art as clasp brakes.

It has for its general object to provide a brake construction embodying a plurality of individual brake units or sets of brakes which are self-equalizing in the application of braking force and in which, each brake unit, or independent brakes, is equipped with an automatic take-up mechanism for compensation for slack occurring in the brake system as occasioned by wear in use.

It is a further object to provide in a brake system of the above described type, means for causing the slack to be compensated for by adjusting movement which is properly distributed among the several brake units whereby all of the brake shoes will be maintained in proper operating position and in proper spaced relation to the wheel with which it is associated.

It is a further object to provide a brake system embodying the above stated objects which is simple in construction, efficient in operation and which is capable of functioning in a manner to produce desirable results heretofore unattainable.

The merits of the present invention will appear from the following disclosure of one embodiment thereof which is given merely by way of example, and the utility of the invention will be obvious from the advantages which are realized in the particular embodiment illustrated.

The following description will be more readily understood by referring to the accompanying drawings, in which—

Figure 1 is a plan view of a portion of a railroad car truck equipped with a braking system and rigging constructed in accordance with this invention.

Figure 2 is a side elevation of the construction shown in Figure 1.

Figure 3 is a cross sectional view of Figure 1 taken on the line 3—3 and looking in the direction of the arrows.

Figure 4 is an end elevation of the construction shown in Figure 2 looking from the left.

Figure 5 is an end elevation of the construction shown in Figure 2 looking from the right.

Inasmuch as the opposite sides of the truck and brake rigging herein disclosed are similar in construction, only one-half is shown in the drawings and described with the belief that this will make for a simplified explanation and a better understanding of the invention.

By referring to the drawings, it will be noted that the present disclosure relates to a railroad car truck comprising a truck frame 10 of usual construction having end members 11 and 11', center members 12 and 12' and side members 13, only one of the latter of which is shown. The truck frame is provided with journal box supporting and guiding pedestals 14 and 14' for receiving in the usual manner journal boxes, not shown, which support the wheels and axles represented diagrammatically as at 15 and 15'.

The above described frame structure constitutes no part of the present invention as the brake rigging construction contemplated in this invention may be applied to any form of car truck and accordingly the truck frame is herein represented only diagrammatically.

At the opposite ends of the truck frame mounted on the end members 11 and 11', respectively, are the brackets 16 and 16' provided with pivots 17 and 17' constituting mountings for the swinging links 18 and 18'. Other brackets 19 and 19' are provided centrally of the truck frame on the center members 12 and 12', respectively. These brackets are provided with pivots 20 and 20' serving as mountings for the swinging links 21 and 21'.

The brackets above referred to may be attached to the frame construction by any suitable means, such as, for instance, rivets or bolts shown at 22 in the drawings. The swinging links are pivotally attached at their lower ends by means of pivot bearings 23 to the brake beams 24 which form a mounting for the brake shoes 25, 26, 27 and 28. Mounted on the end member 11, by means of bolts or rivets 22, is the bracket 29 forming a pivot support 30 for the brake operating lever 31. The lower end of the lever is provided with a pivot 32 for connection with the tie link 33 which link is connected to the brake beam 24 carrying the brake shoe 25. The operating lever 31 is connected to a second operating lever 34 through connecting mechanism A embodying in its construction an automatic slack take-up to be hereinafter more fully described.

The lower end of the operating lever 34 is provided with a pivot 35 for connecting the tie link 36 to the brake beam 24 carrying the brake shoe 26. The upper end of the operating lever 34 is pivotally connected as at 37 to the cross bar 38. The cross bar 38 is pivotally connected to a tie-rod 39 having its opposite end pivotally connected as at 40 to the upper end of a third operating lever 41.

Mounted on the center members 12 and 12' is a pair of brackets 42 and 42' attached as by means of bolts or rivets 22 which brackets serve as guides for the tie-rod 39. The lower end of the operating lever 41 is provided with a pivot 43 serving as a connection for the tie link 44 which is connected to the brake beam 24 carrying the brake shoe 27. The operating lever 41 is connected to a fourth operating lever 45 through the instrumentality of a connecting mechanism B substantially similar in construction to the connecting mechanism A, previously referred to and hereinafter more fully described. The lower end of the operating lever 45 is provided with a pivot 46 serving as a connection for the tie link 47, which link is also connected to the brake beam 24 carrying the brake shoe 28. The upper end of the operating lever 45 is connected by means of a pair of links 48 and universal knuckle member 49 to the operating yoke 50. The operating yoke is held for longitudinal sliding movement in the guideway provided by the bracket 51 attached to the upper portion of the bracket 16' by means of bolts or rivets 52. The ends of the yoke are extended and are pivotally connected as at 53 to the end of a tension spring 54 adjustably fixed relative to the truck frame by means of the bracket 55 and screw threaded connection 56. The bracket 55 may be mounted in any desired manner but is shown as attached to the upper portion of the side sill 13 by means of rivets or bolts 22.

It is, of course, to be understood that the operating yoke 50 extends to the opposite side of the truck and is correspondingly mounted. Likewise the cross bar 38, previously described, extends to the opposite side of the truck and is connected to the pivot at the upper end of the operating lever corresponding to the operating lever 34.

The bracket 16 is provided with a depending portion having an opening 57 through which is positioned the rod 58. The inner end of the rod is pivotally attached as at 59 to the swinging link 18 and is further provided with a spring 60 and abutments 61 and 62 at opposite ends of the spring. The abutment 61 is arranged to slide relative to the rod 58 and to be maintained in abutment with the depending portion of the bracket 16, whereas the abutment 62 is held immovable relative to the rod 58 by any suitable means such as the nut 63. The mechanism constitutes an elastic extension device connected to the link 18 and the brake beam 24 carried thereby for the purpose of urging under normal conditions the brake beam and brake shoes carried thereby in off-position.

At the opposite end of the truck connected between the bracket 16' and the link 18' is a corresponding elastic extension device which will be designated by the corresponding reference numerals with a prime thereafter.

With an understanding of the mechanism described above, and with the further understanding that the connecting mechanisms A and B will, under normal conditions, act in the capacity of a rigid link for imparting movement between the operating levers 31 and 34 and 41 and 45, respectively, it will be appreciated that when the operating yoke 50 is drawn to the right, as shown in the drawings, that the operating lever 45 will be centrally pivoted at its connection with the mechanism B and will act as a lever of the first class to apply the brake shoe 28. This position of the brake shoe renders the pivot 46 incapable of further movement to the left which causes a further movement of the operating yoke 50 to swing the operating lever 45 bodily on the pivot 46 in a manner to move the operating lever 41 through the mechanism B. The initial movement of operating lever 41 takes place at the pivot 40 whereby the brake shoe 27 is applied in braking engagement against the wheel. Upon reaching its wheel engaging position the pivot 43 becomes arrested against further movement to the right, as shown in the drawings, which causes further movement imparted to the lever 41 to rotate the lever on the pivot 43 in a manner to exert a pulling force on the tie-rod 39. After the brake shoes 27 and 28 have been brought into braking engagement with the wheel 15' the two operating levers 45 and 41 can further move together each around its own lower pivot to impart the necessary movement to the other set of brakes until they are correspondingly applied. The transmission of the force, however, through the mechanism in series in the manner above described assures at all times that the application of braking force is equalized. This is because the pivots 46 and 43, which become fixed by virtue of the engagement of their respective shoes, must remain fixed in order to impart the brake application force to the other set of brakes and accordingly the forces are balanced whereby each of the brake shoes will receive an equal portion of the brake applying force imparted to the system.

Continuing the explanation of the operation, it will be obvious that movement of the tie-rod 39, as above described, will be in the righthand direction, as shown in the drawings thereby causing the lever 34 to operate as a lever of the first class around its pivot with the connecting mechanism A, to apply the brake shoe 26 and to arrest the pivot 35 against further movement to the left, as shown in the drawings. The continued movement of the tie-rod 39 will cause the operating lever 34 to pivot at 35 thereby causing, through the connecting mechanism A, a movement of the operating lever 31 around its pivot 30 in a manner to apply the brake shoe 25.

The above operation is that which takes place under ordinary conditions of brake application, it being understood that when the brake applying force, which is imparted to the operating yoke 50, is released that the springs 54 connected to the opposite ends of the operating yoke 50, together with the elastic extension devices, connected to the swinging links 18 and 18', respectively, will restore the brakes to their off-positions by a reverse series of movements to that above described. Thus it may be understood that a releasing movement of the actuator bar 50 produced by the force of the springs 54 transmits a thrust to the upper end of lever 45, thereby rotating the lever 45 about its central pivot and releasing brake shoe 28, assisted by the force of the spring 60'. The movement of brake shoe 28 to released position correspondingly moves the brake shoe 27 on the opposite side of the wheel through the link 71' which tends to rotate the brake lever 41 about its upper pivot. During this releasing movement, if the frictional connection between link 71' and lever 45 has been moved during actuation of the brakes to take up slack, the slack adjuster mechanism B will operate to take up the slack and maintain the correct adjustment between the shoes. After a predetermined travel of the actuator 50 and brake lever 45 in the released direction, the lost motion in the slot 92 of link 90 will be taken up, as hereinafter described, thereby transmitting a releasing movement to the rod 39 for releasing the other set of brakes.

It will be further appreciated that the brake mechanism as above described will serve well under conditions of ordinary use with ordinary links substituted for the mechanisms A and B but that no provision for slack occasioned by wear is included, but inasmuch as it is found desirable in practice to maintain the clearance between the brake shoes and wheels substantially constant at all times, it is desirable to provide means, preferably automatic, for shortening the connecting link between the two sets of operating levers 31, 34, 41 and 45 respectively to compensate for slack. The means herein provided for accomplishing this result, designated as A and B, is substantially similar in construction and operation to the mechanism disclosed in the Patent No. 1,124,813, issued to William H. Sauvage, June 12, 1915, and therefore the slack adjusted mechanism, per se, broadly considered is not herein claimed as a novel feature of the present invention.

The novelty of the present invention, however, among other things, resides in the entire mechanism, together with special features and parts of the mechanism herein described in detail and pointed out in the appended claims.

The slack adjusting mechanisms A and B will not be described here in great detail, it being considered sufficient to explain that the mechanism A comprises a link 65 pivoted at 66 to the operating lever 34 and provided with a slot 67 having slidable engagement with the pin 68 carried intermediate the length of the operating lever 31. The link 65 is extended beyond the slot and terminates in a housing 69 into which extends the end of a fork, or similarly constructed member, 70, pivotally mounted at its opposite end on the pivot 68.

The slack adjuster mechanism is so constructed that a pull on link 65, due to movement of the lever 34, rigidly transmits movement to the lever 31. Whereas, a thrust transmitted through link 65 produces relative movement between the housing 69 and the internal member 70 but the relative movement can only occur in one direction so that as the brake shoes wear, the distance between pivots 66 and 68 becomes increasingly less. As a preferable construction for the housing 69, reference may be made to Patent No. 1,124,813, previously mentioned, in which shims are used to take up the slack brought about by the relative movement between the parts.

Also connected to the pin 68 is a spacing link 71 provided with a slot 72 whereby it will have a sliding movement relative to the pivot 68 and the operating link 31. The opposite end of the spacing link 71 is provided with an elongated slot 73 through which it is frictionally connected to the pivot 74 carried by the operating lever 34 and located at a point more distant from the end pivot 37 than the central pivot 66.

By referring to Figures 4 and 5 it will be noted that the friction connection referred to comprises the pivot bolt 74 having an integral or otherwise rigidly attached head 75 thereon for engagement with one side of the operating lever and a nut and washer 76 and 77, respectively, in engagement with the other side of the operating lever. The bolt is further constructed with an extension 78 having the spring 79, washer 80 and nut 81 all arranged to cause a friction binding between the slotted end of the spacing link 71 and the head 75 of the bolt. The frictional contact is such that under normal conditions of operation there will be no relative movement between these parts. This particular type of friction connection is considered novel, in that it permits the necessary pivotal movement which is occasioned in operation without interference with the frictionally bound surfaces. That is the bolt can freely turn between the head 75 and the washer 77 relative to the link whereby it will be maintained immovable relative to the end of the spacing link.

The mechanism B is of substantially the same construction as that above described with the exception that it is particularly adapted to the present invention and, as shown, the spacing link 71' is positioned in the reversed direction relative to its cooperating link 65' and housing member 69'.

Another feature of importance will be readily understood when it is known that the slot 72 provided between the pivot 68 and the spacing link 71 is to provide the relative movement occasioned in ordinary operation between the connected operating levers, it being, of course, appreciated that the spacing will vary somewhat due to the fact that the levers are pivoted on different centers. The slot is ordinarily designed to accommodate the variable spacing occasioned by the relative movement between the operating levers when the operating levers move through the distance necessary to apply the brake shoes which are spaced from their cooperating wheel by the desired amount of clearance. Thereafter, however, when wear takes place and the clearance is increased, the movement of the levers occasioned in application of the brakes is greater than the predetermined amount above referred to, thereby causing a relative movement at the friction connection.

The movement at the friction connection occasions a resetting of the space between the operating links which causes, upon release movement of the brake, an operation of the slack adjuster substantially in the manner set forth and described in the patent referred to.

With this in mind, however, and knowing that the movement of the operating levers 41 and 45 is such that it not only applies the brake shoes directly connected thereto but also, through the tie-rod 39, the other set of brake shoes, it is obvious that the slot 72' between the spacing link 71' and the operating lever 41 must be larger than the slot 72.

The present invention in particular relates to a connection which, in the illustrated form, is a link 90 pivotally attached as at 91 to the upper end of the operating lever 45 and accordingly directly to the operating yoke 50 and by a lost motion connection at its opposite end to the pivot 40, or, in other words, directly to the tie rod 39. The lost motion is provided by means of a slot 92 which is selected of such size and is so positioned that upon application of braking force the link 90 will have no function in transmitting brake application force to the tie-rod 39, but will leave the above described mechanism undisturbed to convey the brake application force by a series transmission through the entire mechanism. Upon release movement the slot connection will permit a series movement as occasioned by the return of the parts under the influence of the springs 54 until the brake shoes 27 and 28 have moved to their maximum off-positions plus such additional movement as may be necessary due to wear to effect the proper functioning of the slack adjuster B and will thereafter transmit directly the additional movement directly to the tie-rod 39 to force that portion of the return movement, which is necessary to restore the other set of brake shoes to their maximum off-positions and to effect the proper slack adjustment at the mechanism A, to the other set of brakes shown at the left in the drawings. This improvement, therefore, resides in a plurality of brakes or sets of brakes, self-equalizing in character connected for series operation when actuated in both brake applying and releasing directions under normal or unworn conditions and in which each brake unit or sets of brakes is provided with an automatic slack adjuster, and having means for assuring that the slack to be taken up in the various sets of brakes will be compensated for in a manner properly distributed among the several brakes or sets of brakes. In other words, the mechanism is permitted to operate by a series transmission of force in so far as the first set of brakes is restored to its off-position and the slack properly taken up after which time the series operation is discontinued in favor of a direct application of release force to the other set or sets of brakes. This operation assures the proper adjustment for slack in each set of brakes and prevents the first set from taking up a large and improper amount of the slack which would result in a destruction of the adjustment and operation thereof.

It is, of course, understood that the elastic extension devices located at opposite ends of the truck tend to restore the brake sets by a pulling action opposite to that of the operating yoke 50 which action establishes a tendency for the slack to be properly adjusted, but inasmuch as a great portion of the force for restoring the parts to released position is provided by the springs 54, the present mechanism embodying the slotted link 90 has great utility.

It is obvious that due to the fact that housing 69 and the rod 70 can be readily separated by the force imparted by the springs 54 as distinguished from the pull from the opposite direction of the elastic extension devices that all of the slack might be taken up in the adjusting mechanism B in a series of brake sets as described, if some means, such as the link 90 provided by the present invention, were not employed.

Movement of the actuator bar 50 transmits a brake setting force to the first set of brake shoes 27—28 through the brake levers 41—45 and the connecting link 65'. After the first set of brakes is fully applied, the rod 39 will be moved to actuate the second set of brakes in a similar manner and all the brake shoes will be applied with an equalized force. During the brake setting movement, the link 90 has no effect since the pivot 40 at the upper end of the brake lever 41 will not come to the end of the slot 92. Any wear of the shoes will be taken up by the links 71 and 71' due to movement of the frictional connections relative to the levers 34 and 45. Upon release of the brake setting force applied to the bar 50, the springs 54 will act to return the bar 50 and release the first set of brake shoes 27—28 assisted by the springs 61'. If there has been previously any movement of the link 71' relative to the brake lever 45, the slack will be automatically taken up by the adjustor mechanism B. The releasing movement of the actuator bar 50 brings the pivot 40 at the upper end of the lever 41 to the end of slot 92 in link 90 and therefore a direct movement will be imparted to the rod 39 tending to release the second set of brakes in a similar manner.

The above disclosure is given merely as one embodiment of the present invention, and is not to be considered as limiting the invention in any way. It is obvious that various structures may be employed as equivalent for effecting the operation of the brake rigging herein disclosed. The scope of the invention will be determined by an understanding of the present disclosure as one embodiment thereof and will be particularly pointed out in the appended claims.

I claim:

1. In a brake rigging, the combination of two pairs of clasp brakes having link connections therefor, means connected for actuating the first of said pairs of brakes and for setting said both pairs of brakes by application of the brake setting force by series transmission through said link connections, each pair of brakes having means for adjusting slack therein, and means operating during releasing movement for connecting said actuating means and the second of said pairs of brakes, directly after a predetermined amount of relative motion therebetween.

2. In a brake rigging, the combination of a plurality of sets of brakes connected for series operation each provided with a slack adjuster, an actuator for said sets of brakes and means connecting said sets of brakes to said actuator imparting release movement to each directly after a predetermined amount of movement of the next preceding set.

3. In a brake rigging, a plurality of sets of brakes connected for series operation, means for each set comprising two parts adapted to be maintained against relative movement by a pushing action one upon the other, but adapted to separate upon a pulling action one from the other, and means for imparting release movement to one of said sets of brakes for forcing a release movement thereof after a predetermined amount of release movement of another of said sets of brakes.

4. In a brake rigging, a plurality of brakes, said brakes being connected for series operation, means for releasing said brakes connected for imparting release movement directly to one of said brakes to force release movement thereof after a predetermined amount of release movement of another of said brakes.

5. In a brake rigging, a plurality of pairs of brakes, operating levers for the brakes of each pair, means capable of being automatically shortened under conditions of slack maintaining said levers of each pair of brakes separated a predetermined amount and means for imparting slack movement to one of said pairs directly after a predetermined amount of slack movement of another of said pairs of brakes.

6. In a brake rigging of the character described, having a slack adjuster, an operating lever and a spacing link connected thereto by frictional engagement, said connection comprising a bolt having free pivotal engagement with said lever and means for releasably binding said link and bolt together independently of said lever and pivot.

7. In a brake rigging of the character described, having a slack adjuster, an operating lever and a spacing link connected thereto by frictional engagement, said connection comprising a bolt having free pivotal engagement with said lever and means for releasably binding said link and bolt together wholly out of contact with said lever.

8. In a brake rigging of the character described, having a slack adjuster, an operating lever and a spacing link connected thereto by frictional engagement, said connection comprising a bolt having free pivotal engagement with said lever and frictional binding engagement with said link, and having a rigid flange thereon between said lever and link.

9. In a brake rigging, a plurality of pairs of clasp brakes, and as many pairs of operating levers therefor, connections for said pairs of levers, the levers of each pair being separated by a link mechanism capable of automatic shortening, to compensate for wear, means for imparting brake applying and brake releasing forces to said brakes by series transmission of force through said levers, links and connections, and means for imparting release movement directly to certain of said pairs of levers after a predetermined movement of the next preceding pair.

10. In a brake rigging, a plurality of pairs of clasp brakes and as many pairs of operating levers therefor, connections for said pairs of levers, the levers of each pair being separated by a link mechanism capable of automatic shortening, to compensate for wear, means for imparting brake applying and brake releasing forces to said brakes by series transmission of force through said levers, links and connections, and means for imparting release movement directly to certain of said pairs of levers after the next preceding pair has been moved to off position and sufficiently in addition to take up slack in that pair.

11. In a brake rigging, a plurality of pairs of clasp brakes, and as many pairs of operating levers therefor, connections for said pairs of levers, the levers of each pair being separated by a link mechanism capable of automatic shortening, to compensate for wear, means for imparting brake applying and brake releasing forces to said brakes by series transmission of force through said levers, links and connections, and a link for imparting release movement to certain of said pairs of levers after a predetermined movement of the next preceding pair.

12. In a brake rigging, a plurality of pairs of brakes and levers therefor, means connecting the pairs of levers for series operation, slack adjusting mechanism connecting the levers of each pair, comprising a pull link and a spacing link each of the spacing links being provided with a predetermined slight lost motion.

13. In a brake rigging, a plurality of pairs of brakes and levers therefor, means connecting the pairs of levers for series operation, slack adjusting mechanism connecting the levers of each pair, comprising a pull link and a spacing link each of the spacing links being provided with a slot at the point of connection with one of said levers.

14. In a brake rigging, a plurality of pairs of brakes and levers therefor, means connecting the pairs of levers for series operation, slack adjusting mechanism connecting the levers of each pair, comprising a pull link and a spacing link each of the spacing links being provided with a slot at the point of connection with one of said levers, the slot of the spacing links of the first pair of brakes being of greater length than the slots of the spacing links of the remaining pair.

15. In a brake rigging, a plurality of pairs of brakes and levers therefor, means connecting the pairs of levers for series operation, slack adjusting mechanism connecting the levers of each pair comprising a pull link and a spacing link, each of the spacing links being provided with a slot at the point of connection with one of said levers, the slots being successively smaller in the direction of said series operation.

16. In a brake rigging, a plurality of pairs of brakes and levers therefor, means connecting the pairs of levers for series operation, slack adjusting mechanism connecting the levers of each pair comprising a pull link and a spacing link, each of the spacing links being provided with a slot at the point of connection with one of said levers, the slots being successively smaller in the direction of said series operation, an actuator for setting and releasing the brakes and means connecting the actuator to directly release a second pair of said brakes after a predetermined releasing movement of a first pair of brakes.

Signed at Chicago, Illinois, this 16th day of July, 1928.

WILLIAM C. HEDGCOCK.